Figure 1:
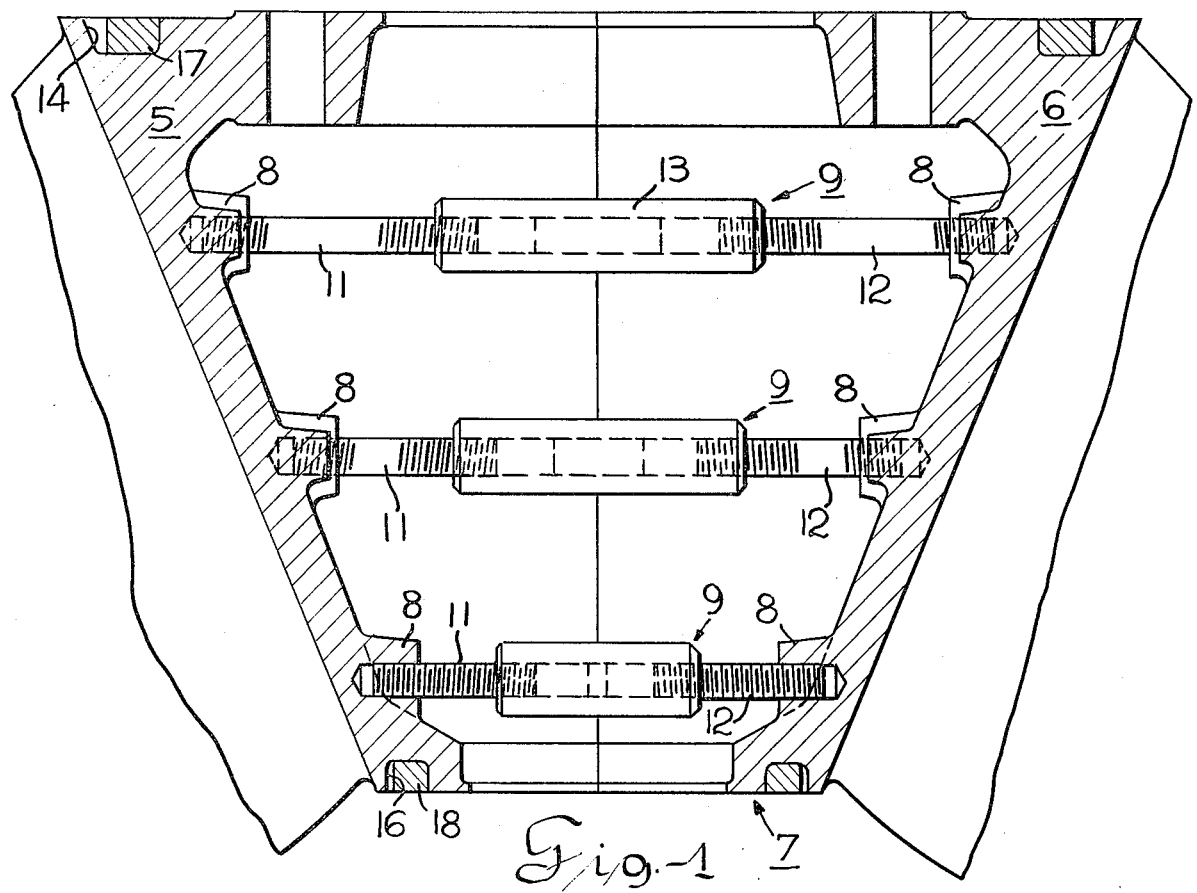

United States Patent [19]
Eyster et al.

[11] 3,973,876
[45] Aug. 10, 1976

[54] RUNNER HUB CONSTRUCTION FOR PROPELLER TYPE TURBINE

[75] Inventors: Paul J. Eyster; Edward J. Yanek, both of York, Pa.

[73] Assignee: Allis-Chalmers Corporation, Milwaukee, Wis.

[22] Filed: Nov. 13, 1974

[21] Appl. No.: 523,547

[52] U.S. Cl. ............................ 416/244 A; 403/344; 416/214 A; 416/245 A
[51] Int. Cl.² .......................................... F03B 3/12
[58] Field of Search ........... 416/208, 212, 214, 244, 416/245, 245 A; 403/312, 344

[56] References Cited
UNITED STATES PATENTS

| | | | |
|---|---|---|---|
| 47,137 | 4/1865 | Sutherland | 416/212 |
| 116,414 | 6/1861 | Cochrane | 403/344 X |
| 403,902 | 5/1889 | Bailey | 403/344 X |
| 420,038 | 1/1890 | Coddington | 403/344 X |
| 2,949,964 | 8/1960 | Froelich et al. | 416/245 |

FOREIGN PATENTS OR APPLICATIONS

| | | | |
|---|---|---|---|
| 874,235 | 6/1971 | Canada | 416/212 |
| 976,463 | 9/1963 | Germany | 403/344 |
| 26,712 | 1897 | United Kingdom | 403/344 |

Primary Examiner—Everette A. Powell, Jr.
Attorney, Agent, or Firm—John P. Hines

[57] ABSTRACT

A runner hub for a propeller type hydraulic turbine wherein the hub is constructed of at least a pair of arcuate segments. When the arcuate segments are assembled together, they form a hollow hub. Turnbuckles are provided within the hub attached to opposite hub segments and are adjustable to forcibly hold the hub segments in the assembled position.

1 Claim, 2 Drawing Figures

RUNNER HUB CONSTRUCTION FOR PROPELLER TYPE TURBINE

This invention pertains to propeller type hydraulic turbines and more particularly to a hub construction for such a turbine.

In hydraulic turbines of the propeller type, the runner blades are attached to a hub which is in turn attached to the turbine shaft. As the size of turbines has increased, many runner hubs have been constructed of arcuate sections with each section being provided with one or more radially directed runner blades. Each arcuate section is provided with a bolting flange to hold the sections in the assembled position.

As the hydraulic machines have gotten bigger and the forces, both centrifugal and water thrust forces, have increased, additional and larger bolts have been required to provide the necessary holding force. In many instances, it has proven quite difficult for the turbine designer to find adequate space for the required number of bolts necessary to withstand the forces imposed on the hub.

In certain instances, it has been possible to provide shrink rings in the opposite axially directed faces of the hub segments. The rings are shrunk into place holding the runner hub segments in the assembled position. An example of such a propeller-hub construction is shown in Canadian patent 874,235, issued to Dominion Engineering Works Limited, June 29, 1971. However, the shrink ring construction is not alone suitable for extremely large machines since sufficient holding force cannot be executed on the hub segments.

It is the general intention and main object of this invention to provide a hub for a propeller type hydraulic turbine wherein sufficient holding force can be exerted on the hub sections without the necessity of providing bolt attaching flanges.

An additional object of this invention is to provide a runner hub construction of the hereinbefore described type with hub section attaching rods within the hollow interior of the runner hub.

A more specific object of the subject invention is to provide a runner hub of the hereinbefore described type with adjustable turnbuckles attached to oppositely disposed runner sections within the hollow interior of the hub for holding the runner sections in the assembled position.

Figure 2:
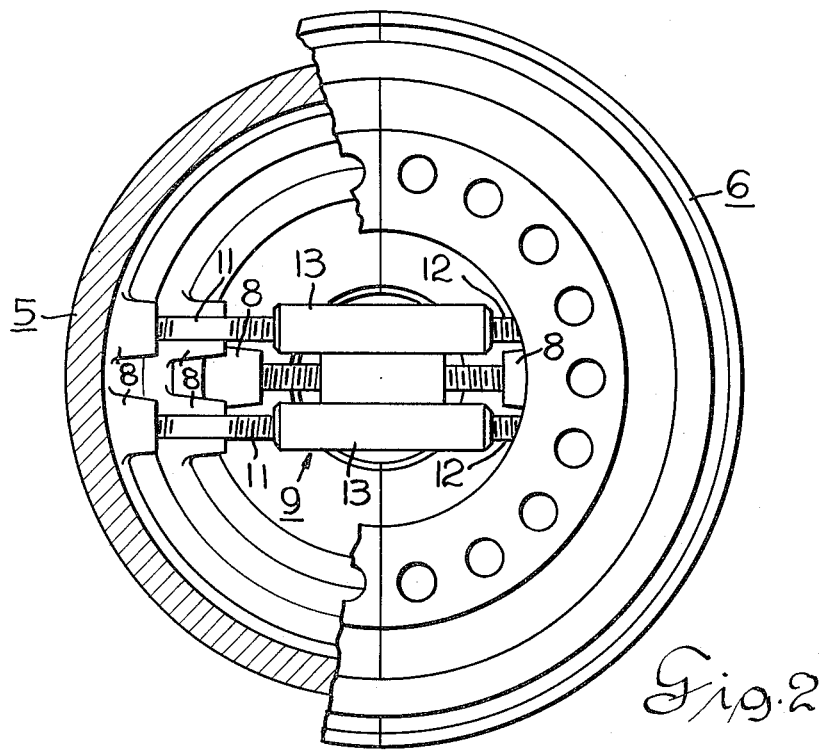

These and other objects of the subject invention will become more fully apparent as the following description is read in light of the attached drawing wherein:

FIG. 1 is a side elevation partially in section showing a hydraulic turbine runner hub constructed in accordance with the invention; and FIG. 2 is a plan view partially in section of FIG. 1.

Referring to the drawings, the runner hub of this invention is shown for purposes of illustration composed of two sections 5 and 6. Each section is arcuate in cross section and when assembled together, they form an annular hub generally designated 7 having a hollow interior.

Each hub section is provided with a plurality of internally threaded bosses 8. These bosses 8 are so constructed and arranged that when the hub is in the assembled position shown, the bosses in opposite sections are in facing alignment with one another. A plurality of turnbuckles generally designated 9 are provided within the hollow interior of the hub 7. The turnbuckle is of any conventional type and consists of two rods 11 and 12 each having opposite hand threads on the ends thereof. Each turnbuckle is also provided with a center member 13 having internally threaded ends of opposite hand which receive one threaded end of each rod 11 and 12. The opposite ends of each threaded rod 11 and 12 are turned into the aligned threaded bosses 8.

In assembling the runner hub, the sections 5 and 6 are brought together with the tie rods in the positions shown in the drawings. The tie rods are then prestressed and tightened to exert necessary predetermined holding force on the hub sections.

In many instances, sufficient holding force can be obtained with the tie rods so far disclosed. However, if additional holding force is required, annular grooves 14 and 16 can be provided in the end faces of the hub. Rings 17 and 18 may then be shrunk into such grooves to provide the additional holding force.

From the above description, it can be seen that a hub for a propeller type hydraulic turbine has been provided with the means for holding the hub sections together provided in the hollow interior of the hub. With this arrangement, the large bolting flanges previously required are no longer necessary.

The embodiments of the invention in which an exclusive property or privilege is claimed are defined as follows:

1. A runner hub for a hydraulic turbine comprising: a pair of arcuate hub segments constructed and arranged to be assembled together to form an annular hollow truncated cone-shaped hub having oppositely disposed end surfaces, the joint between said hub segments lying in a plane which passes through the diameter of each circle defined by said cone-shaped hub; at least one runner blade rigidly connected to and extending radially from each hub segment; a first and second pair of axially spaced internally threaded bosses on the interior surface of each segment, the bosses of each pair being circumferentially spaced from one another, said bosses being arranged in opposite facing alignment with one another when said segments are in the assembled position; a rod threaded at each end threadably received in each boss and extending inwardly of said hub, the inner end of each rod being aligned and adjacent to the inner end of a complementary rod, the threads on the adjacent rod ends being of a different hand; a hollow cylinder having an internal thread at each end thereof of a different hand, each cylinder being threadably received on complementary threads of adjacent rod ends, said rods and attached cylinders extending substantially diametrically across said hub transverse to said hub segment joint, said cylinders being adjustable to forceably pull and hold said segments in mating engagement; walls defining an annular groove in each end surface; and a shrink ring contained in each groove to hold said runner segments in the assembled position.

* * * * *